United States Patent Office 3,619,980
Patented Nov. 16, 1971

3,619,980
METHOD FOR REMOVING POLLUTANTS FROM THE ATMOSPHERE
Lester M. McKay, 16260 Kivitt Lane,
Reno, Nev. 89502
No Drawing. Filed Aug. 19, 1968, Ser. No. 753,720
Int. Cl. B01d 47/00
U.S. Cl. 55—84                                5 Claims

ABSTRACT OF THE DISCLOSURE

A method of removing pollutants from the atmosphere using the storm drains and/or sewer systems of a city. The downward pressure of a temperature inversion is used to cause the lower layer of the atmosphere to flow to catch basins or other openings in the drains and sewer systems. A series of low powered fans or water flow in the sewer is used to create a steady horizontal flow of air through the drains and sewer system.

BACKGROUND OF THE INVENTION

As is well known most metropolitan areas are plagued by air pollutants and other atmosphere contaminants. The pollutants take various forms and include both gases and liquids such as sulfur dioxide, carbon monoxide, ozone, nitrogen oxide, 3,4-benzpyrene, olefins, and other hydrocarbons. These pollutants contribute to the cause of many chronic and acute cardiopulmonary diseases such as bronchities, asthma, lung cancer, emphysema and other distructive diseases. In some areas of the world high concentrations of pollutants have caused deaths and morbidity.

The pollutants are generated by many instrumentalities such as automobile exhausts, industrial fumes, refuse, heating and power generation, and the like. Normally the pollutants, being warmer than the ground level atmosphere rise and are disposed or swept away by the upper air currents. Under certain atmospheric conditions the normal disposal of pollutants is interrupted and the pollutants remain at ground level or at a relatively low level. These atmospheric conditions often occur at night when the ground level atmosphere cools while the upper atmosphere remains warm. This is one type of temperature inversion. A second type of inversion occurs when a high pressure system causes a mass of warm air to remain stationary over an area. Both of these inversions hold the pollutants at ground level or low levels and prevent the normal circulation and disposal of air pollutants into the upper atmosphere. When either of the inversions continue for an extended time it results in a condition that is commonly referred to as smog.

In the past all attempts to solve the problem of air pollution has been directed towards reducing or controlling the discharge of pollutants into the atmosphere. For example, limits have been placed on the emissions from automobile engines. Also limits have been placed on the amount of sulfur that can be contained in the fuel burned in power generation and heating plants in various cities. Controls have been imposed to limit the burning of refuse and industrial discharge into the atmosphere.

While it is of course desirable to limit or reduce the quantity of pollutants discharged into the atmosphere, this approach does not solve the problem. It is now apparent that the problem of a polluted atmosphere caused by a temperature inversion cannot be solved by attempting to limit the quantity of pollutants discharged to the atmosphere. In time even a reduced amount of pollutants will accumulate until they contaminate the atmosphere and render it dangerous to health. Even when various sources of pollutants are reduced to the minimum, the level of pollutants in the atmosphere can rise to a dangerous level when a temperature inversion occurs.

SUMMARY OF THE INVENTION

The present invention solves the problem of air pollution or smog by using the temperature inversion to assist in removing the pollutants from the atmosphere. The pollutants are removed through storm drain or sewer systems of localities where smog occurs. Both a storm drain system and sewer system will be referred to hereafter as a sewer system and the term sewer system when used refers to either system or both. The temperature inversion is used to assist in moving the pollutants into the sewer system.

The initial flow of pollutants into the sewer system can be economically induced by a flow of water in the sewer system. The surface tension resulting from the flow of water will create venturi action which will draw the low level pollutants into the sewer system. Once started the temperature inversion will assist to force or push the pollutants into the sewer system.

In those cities that do not have a low cost water supply, low powered fans can be used to initiate the flow of pollutants into the sewer system. The fans can be low powered since they are not required to compress the atmosphere, but only initiate the flow into the sewer system. Once the flow of pollutants into the sewer system has started, they can be disposed of by any of a number of various methods. For example, the water soluble gases can be dissloved in water and later recovered as byproducts. Additional pollutants, such as hydrocarbons, can be condensed and also recovered as byproducts.

DESCRIPTION OF A PREFERRED EMBODIMENT

As explained above atmospheric pollutants include various gases and unburnt hydrocarbons. Among the gases are carbon monoxide, sulfer oxides and nitrogen oxides that are by-products of most combustion processes. In addition unburnt hydrocarbons and particulate matter is also discharged into the atmosphere from combustion processes. Lesser amounts of other gases and particulate matter are discharged into the atmosphere from various industrial processes. While lesser amounts of other gases are discharged, they contribute to the problem of smog during temperature inversions.

Under normal atmospheric conditions the pollutants rise and are blown away by the air currents at higher altitudes. When a temperature inversion occurs the pollutants cannot rise and thus remain at ground or relatively low levels. Temperature inversions can occur either as a result of a frontal activity or as a result of cooling of the atmosphere at night. A smog condition can remain until the temperature inversion is removed, either by dispersal of the frontal activity or warming of the atmosphere during the day.

While in most cases no serious problems have arisen during prolonged smog conditions, there are some notable exceptions. For example hundreds of people have died in London and Donora, Pa. during prolonged smog attacks. Even in the absence of deaths prolonged smog attacks have caused severe health problems for many people.

At the present time no effort and no method is available or known for removing smog. Thus in case of a prolonged attack the general populace may suffer serious injury. A major advantage of this invention is that it mainly uses existing facilities to remove the smog. Further the invention removes the highest concentrations of pollutants (i.e. those at low level) and thus provides immediate improvement and relief.

As previously indicated this invention uses the temperature inversion, which contributes to the concentration of smog, to assist in removing it. The temperature inversion forces the pollutant-laden air down to ground level and holds it there. Thus the temperature inversion increases the pressure of that portion of the atmosphere containing the highest concentration of smog. The invention produces a suction at the inlets to the sewer system when a city is subjected to a smog attack or a high concentration of low level air pollution. The suction initiates a flow of the ground or low level layer of the atmosphere through the openings and into the sewer system. After the flow is initiated the temperature inversion will assist the process. The process can continue until the temperature inversion is substantially reduced. Of course the suction in the sewer system will continue to remove the ground level atmosphere but at a reduced rate.

The suction in the sewer inlets can be quickly created by producing a waterflow through the sewer system. The amount of water used will depend on a number of variables of which only a few can be controlled. Among the variables are the nature of the inversion and its height, the day-night temperature differential, the extent of air pollution and its composition and the humidity. It was previously indicated that a major advantage of this invention is that it utilizes existing sewer facilities. Thus the size of existing sewer pipes, the relative smoothness of the pipe surfaces, and the number, location and size of the street drains are additional variables that affect the operation of the invention.

EXAMPLE

A scale model of a metropolitan area is enclosed in an air tight enclosure equipped with suitable inlet valves to allow control of the atmosphere. The model also contains a sewer system in scale. The atmosphere in the enclosed model is controlled to simulate an inversion condition and then normal atmospheric pollutants are introduced through the inlet valves. The simulated sewer pipe has a 4-inch inside diameter. Flowing water is then introduced into the pipe and it is found that the polluted atmosphere is drawn into the simulated sewer pipe at an efficient rate. The water level is varied and it is found that the air velocity inside the pipe is about 80% of the water velocity irrespective of the water level inside the pipe. The water velocity may be varied by changing the slope of the pipe and/or regulating the rate of flow.

The above procedures are repeated except that the inside surface of the pipe is roughened thus producing a greater surface area and greater turbulence in the flowing water. The air flow remains similarly efficient. Greater efficiency in air flow may be experienced when, at least, the bottom of the pipe is shaped with gear-like teeth. When the procedures are repeated using multiple inlets to the simulated sewer pipe the air flow inside the pipe is similarly efficient with air being drawn in from each inlet with the water flow being unchanged.

The water level inside the pipe has no critical importance to the operation of this invention. The rate of flow is of greater importance and the rate that will be maintained will vary depending on variables of the type indicated above. The maintained rate of flow can be varied as required by the extent and nature of the air pollution.

As the height of the inversion increases and the temperature difference between day and night increase the inversion will supply more pressure differential to assist in removing the ground level smog. The water flow in the sewer system creates a venturi effect at each inlet that results in a suction at the inlets. The venturi effect created and thus the suction, depends on the surface tension flowing in the sewer system. Of course as the water surface is increased more water is required and less space is available for carrying away the smog.

In those locations where low cost water is not readily available for flowing through the sewer system to create a venture effect, large low powered fans can be used. Individual fans can be positioned in each catch basin or a small number of larger fans can be disposed in the sewer system. The fans should be capable of moving large volumes of air but are not required to generate a high pressure.

Of course when fans are used without water flowing in the sewer system the water soluble gases will not be as readily removed from the air that flows in the sewer system. Thus the process of removing the pollutants will be slowed unless the velocity of the gas flow through the sewer system can be increased. It should be remembered that even though the process is slowed it will initially proceed at a rapid pace since the inversion will assist the fans. As the inversion decreases the process will slow. This will not be detrimental since the lower ground level atmosphere that contains the majority of auto pollutants will have been removed.

For example, to reduce the height of low level surface air at the rate of one foot per minute on a street that is 528 feet long, 100 feet of width contains 52,800 cu. ft. One storm drain 10 feet in diameter will evacuate 60,800 cu. ft. per minute at a velocity of only 800 feet per minute. Since it is usual to have more than one drain greater efficiency will be experienced. Thus with two drains half the speed is needed and thereby reducing the resistance.

After the pollutants have been removed through use of the sewer system they can be disposed of by passing the gases through water. This will remove the water soluble gases and condense and liquify hydrocarbons. Of course when a water flow is used to initiate the flow of the ground level pollutants into the sewer system the gases will automatically dissolve in the water and the hydrocarbons will be condensed. The gases dissolved in the water can be recovered by various processes and sold as a by-product of the process. In cases where the amount of by-products recovered is not of sufficient value to cover the expense involved, the water can be disposed of by other means. The condensed hydrocarbons can also be recovered or disposed of depending on the availability of suitable disposal means. Even in cases when it is uneconomical to recover the by-products, their recovery and sale will reduce the over-all cost of the process.

OPERATION OF THE INVENTION

The process of the present invention is initiated by starting a flow of water through the sewer system. This will produce a suction at the inlet opening of the sewer system. In some cities it will be desirable to utilize both a water flow and fans to produce a suction at the inlet openings in the sewer system. The suction in the inlet openings will induce the ground level atmosphere to flow into the sewer system. The pressure of the temperature inversion will assist the fans and water flow in drawing the ground level atmosphere into the sewer system.

The soluble gases in the pollutants in the ground level atmosphere will dissolve in the water. In cases where water is not used to produce a venturi effect in the sewer system, the atmosphere drawn into the sewer system can be passed through a water bath. The unburnt hydrocarbons can be condensed and removed from the atmosphere.

MODIFIED EMBODIMENT

The process of this invention can also be applied to most combustion processes to discharge the products of the combustion directly into the sewer or storm drain system. For example, the chimney on a furnace or the like can be replaced with a horizontal flue outlet. The air used in the combustion can be circulated around the flue to cool the combustion gases. The flue is connected to a water bath or trap to remove the soluble gases. The combustion products after flowing through a water trap are passed through a filter to remove the particle matter. After the combustion products pass through the filter they can be discharged into a vented sewer system. If a vented sewer system is not available the combustion products can be discharged into the atmosphere. Since the major pollutants have been removed the combustion products can be discharged into the atmosphere without danger of creating a serious smog problem.

The above system was installed on a domestic fireplace and successfully vented the fireplace. The combustion products after being passed through the water trap and filter were discharged into a vented septic tank system. The fireplace operated and did not require any additional vents or other draft means.

I claim as my invention:

1. A process for removing pollutants from ground level atmosphere comprising:

initiating and maintaining a flow of the said atmosphere in a sewer system by creating a suction at the inlet openings of said sewer system;

the said openings and suction being sufficient to move massive volumes of polluted atmosphere through said sewer system;

the flow of polluted atmosphere in the sewer system being initiated and maintained by introducing and controlling an additional supply of flowing water into said sewer system, said flow of polluted atmosphere being maintained, at least in part, by an existing temperature inversion in the atmosphere above the sewer inlets employing the said additional flowing water as means for removing pollutants from the atmosphere, and conveying the said atmosphere to a disposal area.

2. The process of claim 1, wherein said suction is maintained, at least in part, by fans disposed in the sewer system.

3. The process of claim 1, wherein the atmosphere drawn into said sewer system is passed into contact with water to remove the water soluble gases from the atmosphere.

4. The process of claim 3, wherein the gases dissolved in the water are recovered from said water.

5. The process for venting a combustion process comprising:

passing the combustion gases into a closed vent system then through a water trap to remove water soluble gases;

removing the particle matter from said combustion gases and venting said gases into a vented sewer system;

initiating and maintaining a flow of said combustion gases in the sewer system by creating a suction at the inlet openings of said sewer system;

the said openings and suction being sufficient to move the combustion gases through said sewer system;

the flow of combustion gases in the sewer system being initiated by and maintained by introducing and controlling an additional supply of flowing water into said sewer system, said flow of combustion gases being maintained, at least in part, by an existing temperature inversion in the atmosphere above the sewer inlets employing the said additional flowing water as means for removing the water soluble gases from the atmosphere, and conveying the said gases to a disposal area.

References Cited

UNITED STATES PATENTS

| | | | |
|---|---|---|---|
| 3,335,082 | 8/1967 | Ullaich | 55—84 X |
| 3,358,425 | 12/1967 | Burnham | 55—468 X |
| 3,462,919 | 8/1969 | Zalman | 55—468 X |

REUBEN FRIEDMAN, Primary Examiner

C. N. HART, Assistant Examiner